United States Patent [19]

Wünsch et al.

[11] Patent Number: 6,025,447
[45] Date of Patent: Feb. 15, 2000

[54] GRAFT COPOLYMERS

[75] Inventors: Josef Wünsch, Schifferstadt; Edgar Zeller, Mannheim, both of Germany

[73] Assignee: BASF Aktiengesellschaft, Ludwigshafen, Germany

[21] Appl. No.: 09/157,575

[22] Filed: Sep. 21, 1998

[30] Foreign Application Priority Data

Sep. 19, 1997 [DE] Germany .............. 197 41 497

[51] Int. Cl.$^7$ .............. C08F 8/00; C08F 36/04
[52] U.S. Cl. .............. 525/332.9; 525/338; 525/339; 525/340
[58] Field of Search .............. 525/331.9, 332.9, 525/338, 339, 340

[56] References Cited

U.S. PATENT DOCUMENTS

| | | |
|---|---|---|
| 3,383,426 | 5/1968 | Baker et al. . |
| 3,513,130 | 5/1970 | Mertzweiller . |
| 4,794,096 | 12/1988 | Ewen . |
| 4,914,157 | 4/1990 | Wideman . |
| 5,663,129 | 9/1997 | Emert et al. .............. 508/506 |

FOREIGN PATENT DOCUMENTS

| | | |
|---|---|---|
| 210 615 | 2/1987 | European Pat. Off. . |
| 284 708 | 10/1988 | European Pat. Off. . |
| 490 269 | 6/1992 | European Pat. Off. . |
| 559 108 | 9/1993 | European Pat. Off. . |
| 584 646 | 3/1994 | European Pat. Off. . |
| 91/09882 | 7/1991 | WIPO . |
| 93/03067 | 2/1993 | WIPO . |

OTHER PUBLICATIONS

J. Org. Chem., 369 (1989) 359–370 Weisenfeldt et al.
Bull. Soc. Chim, Belg., vol. 96/n Sep. 1987, Anders et al. Reaction 6–47, 845–854.
J. Org. Chem 1989, 54 4808–4812, Anders et al.
Organometallics, Elschenbroich et al., Second Rev. Ed.1992, Title Page Only.
Anionic Polymerization, Hsieh, Title Page Only.
Beilsteins Handbuch, 1922, Syst. No. 467, 473, pp. 367, 474, 485.

*Primary Examiner*—Jeffrey Mullis
*Attorney, Agent, or Firm*—Keil & Weinkauf

[57] ABSTRACT

Graft copolymers are obtainable by a) reacting vinylaromatic compounds with conjugated dienes to form polymers A) which contain C═C double bonds, b) hydroformylating C═C double bonds present in the polymer A) in the presence of carbon monoxide, hydrogen and a hydroformylation catalyst to form a polymer B), c) isolating the partially or completely hydroformylated polymer B), d) carrying out a C—C-coupling reaction on the formyl groups of the polymer B) with incorporation of a vinylaromatic unit to form a polymer C) and e) reacting the polymer C) with vinylaromatic compounds in the presence of a metallocene catalyst system.

6 Claims, No Drawings

GRAFT COPOLYMERS

The present invention relates to graft copolymers obtainable by
a) reacting vinylaromatic compounds with conjugated dienes to form polymers A) which contain C=C double bonds,
b) hydroformylating C=C double bonds present in the polymer A) in the presence of carbon monoxide, hydrogen and a hydroformylation catalyst to form a polymer B),
c) isolating the partially or completely hydroformylated polymer B),
d) carrying out a C—C-coupling reaction on the formyl groups of the polymer B) with incorporation of a vinylaromatic unit to form a polymer C) and
e) reacting the polymer C) with vinylaromatic compounds in the presence of a metallocene catalyst system.

The invention further relates to a process for preparing such graft copolymers, their use for producing fibers, films and moldings and also to the fibers, films and moldings obtainable therefrom.

The polymerization of styrene in the presence of metallocene catalyst systems leads to polymers having a high stereoregularity and is comprehensively described in, for example, EP-A 0 210 615. Owing to its crystallinity, syndiotactic polystyrene has a very high melting point of about 270° C., high stiffness and tensile strength, dimensional stability, a low dielectric constant and a high chemical resistance. The mechanical property profile is retained even at temperatures above the glass transition temperature.

However, syndiotactic polystyrene is brittle.

EP-A 559 108 describes graft copolymers in which syndiotactic polystyrene is grafted onto a polymer having C=C double bonds in the side chain.

However, a disadvantage here is that the polymer to be grafted on can be prepared only randomly using Ziegler-Natta catalysts. Free-radical or ionic polymerization is not successful since the alkene unit onto which syndiotactic polystyrene is grafted in the second step reacts more slowly than the second alkene unit which is utilized for preparing the polymer to be grafted only in the case of Ziegler-Natta catalysis.

EP-A 490 269 describes a process for preparing styrene graft copolymers by copolymerization of a styrene monomer with a styrene monomer containing a hydrocarbon radical having an unsaturated bond and subsequent graft polymerization with an ethylenically unsaturated monomer. However, a disadvantage of this grafting reaction is that insoluble syndiotactic polystyrene is grafted by a free-radical mechanism. Owing to the insolubility, only very low degrees of grafting are achieved. In addition, an efficient spherical rubber morphology cannot be achieved using this method, since syndiotactic polystyrene forms the graft core.

It is an object of the present invention to provide polymers which do not have the disadvantages mentioned, which have, in particular, high stiffness, tensile strength, dimensional stability and toughness and whose preparation can be carried out using graft polymers prepared by either a free-radical or ionic mechanism.

We have found that this object is achieved by the graft copolymers defined at the outset.

We have also found a process for preparing such graft copolymers, their use for producing fibers, films and moldings and also the fibers, films and moldings obtainable therefrom.

In step a), vinylaromatic compounds are reacted with conjugated dienes to form polymers A) which contain C=C double bonds.

Particularly suitable vinylaromatic compounds are compounds of the formula I

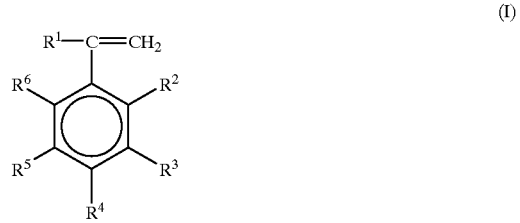

where the substituents have the following meanings:
$R^1$ is hydrogen or $C_1$–$C_4$-alkyl,
$R^2$ to $R^6$ are, independently of one another, hydrogen, $C_1$–$C_{12}$-alkyl, $C_6$–$C_{18}$-aryl, halogen or two adjacent radicals together form a cyclic group having from 4 to 15 carbon atoms.

Preference is given to using vinylaromatic compounds of the formula I in which
$R^1$ is hydrogen.

Possible substituents $R^2$ to $R^6$ are, in particular, hydrogen, $C_1$–$C_4$-alkyl, chlorine or phenyl, biphenyl, naphthalene or anthracene. Two adjacent radicals can also together form a cyclic group having from 4 to 12 carbon atoms, thus giving, for example, naphthalene derivatives or anthracene derivatives as compounds of the formula I.

Examples of such preferred compounds are: styrene, p-methylstyrene, p-chlorostyrene, 2,4-dimethylstyrene, 4-vinylbiphenyl, 2-vinylnaphthalene or 9-vinylanthracene.

It is also possible to use mixtures of various vinylaromatic compounds, where one component can also bear further hydrocarbon radicals such as vinyl groups, allyl groups, methallyl groups, butenyl or pentenyl groups, preferably vinyl groups, on the phenyl ring. Further vinylaromatic compounds such as 1,1-diphenylethylene can likewise be used. However, preference is given to using only one vinylaromatic compound.

Particularly preferred vinylaromatic compounds are styrene and p-methylstyrene.

The preparation of vinylaromatic compounds of the formula I is known per se and is described, for example, in Beilstein 5, 367, 474, 485.

Suitable conjugated dienes are, for example, butadiene, isoprene, dimethylbutadiene and phenylbutadiene. Preference is given to butadiene.

The reaction of vinylaromatic compounds with conjugated dienes is known and is described, for example, in H. L. Hsieh, R. P. Quirk, Anionic Polymerization, Dekker, 1996. The polymers A) can be prepared by anionic, cationic or free-radical polymerization in solution, in bulk, in suspension or in emulsion. If desired, subordinate amounts of further monomers such as olefins can be copolymerized with the vinylaromatic compounds and conjugated dienes.

The polymer A) preferably contains from 3 to 97% by weight of vinylaromatic compounds, in particular from 5 to 95% by weight, and from 97 to 3% by weight of conjugated dienes, in particular from 95 to 5% by weight.

In step b), the polymer A) is then subjected to a hydroformylation in the presence of carbon monoxide, hydrogen and a hydroformylation catalyst, forming a polymer B).

Hydroformylations are likewise known and are described, for example, in Ch. Eschenbroich/A. Salzer, Organometallchemie, Teubner, 1988. The polymer A) can be used in solution, in a swollen state or as a melt. Suitable solvents are inert organic solvents such as saturated and aromatic hydrocarbons, for example hexane, octane, dodecane, decalin, cyclohexane, cycloheptane, benzene, toluene, xylene, ethers, sulfones or mixtures thereof.

Suitable hydroformylation catalysts are all known hydroformylation catalysts, in particular those of transition group VIII of the Periodic Table of the Elements, preferably compounds of rhodium, cobalt and palladium. Preference is given to salts such as hydrides, halides, nitrates, sulfates, oxides or sulfides as well as complexes with carbonyls, amines, triarylphosphines or trialkylphosphines, also with carboxylates or acetylacetonate. Examples of these and processes for preparing them are described, for example, in U.S. Pat. No. 4,914,157.

Preference is given to using $Rh(CO)_2acac$ (=acetylacetonate) and $Co_2(CO)_8$.

The amount of catalyst is usually from 0.01 to 2.0% by weight, based on the polymer A).

The hydroformylation can be carried out within a wide temperature range; it is usually carried out at from 20 to 200° C. Suitable pressures have been found to be from 1 to 1000 bar, in particular from 10 to 600 bar, depending on the choice of catalyst.

The molar ratio of carbon monoxide to hydrogen can vary within a wide range; it is preferably in the range from 0.2:1 to 5:1, in particular from 0.5:1 to 2:1.

Formally, the hydroformylation involves addition of one formyl group and one hydrogen atom onto an olefinic double bond of the polymer A). In the case of a styrene-butadiene-styrene block copolymer A), this can be shown schematically as follows:

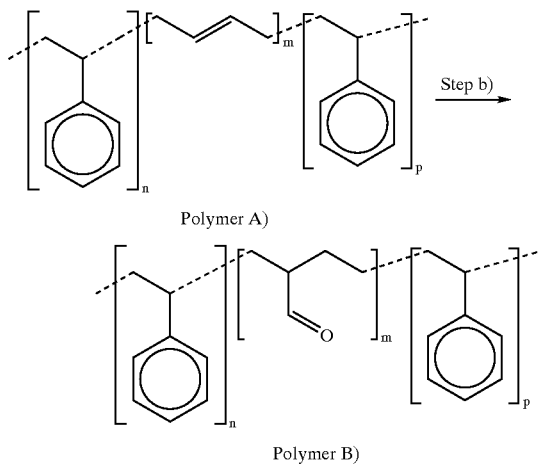

The polymer B), which can be partially or completely hydroformylated, is then isolated in a step c). This removal of the catalyst can, for example, be carried out by (repeated) precipitation of the polymer B) from its solution in a nonpolar solvent, e.g. toluene, by addition of a polar solvent, e.g. methanol, until the desired purity is obtained.

The removal of cobalt catalysts from hydroformylated polymers is described, for example, in U.S. Pat. No. 3,513,130.

In step d), a C—C coupling reaction is carried out on the formyl groups of the polymer B) with incorporation of a vinylaromatic unit, forming a polymer C).

This reaction is preferably carried out as a Wittig reaction. These reactions are known per se and are described, for example, in Advanced Organic Chemistry, 1985, chapter 6–47, pp. 845–854. Use is usually made of phosphorus ylides.

The preparation of Wittig salts is described, for example, in J. Org. Chem. 54, 1989, pp. 4808–4812 (Katritzky et al.). Here, the appropriate alkyl halides, preferably bromides, are usually reacted with triphenylphosphine.

Preference is given to bromoalkylstyrenes, particularly preferably p-bromomethylstyrene. Preferably, triphenylphosphine and the bromide are heated under pressure in an autoclave, with triphenylphosphine bromide being obtained directly.

Shown schematically, this would, remaining with the scheme depicted above, lead to a polymer C) of the following structure:

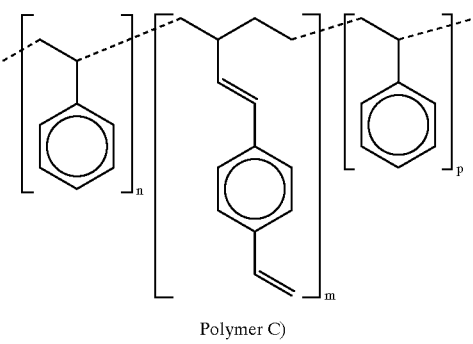

Polymer C)

In step e), the polymer C) is then reacted with vinylaromatic compounds in the presence of a metallocene catalyst system.

Here too, suitable vinylaromatic compounds are, in particular, compounds of the formula I, so that the reader is referred to what has been said there (step a)).

Suitable metallocene catalyst systems are, in particular, those which are obtainable from a metallocene complex, a compound capable of forming metallocenium ions and, if desired, an aluminum compound.

As metallocene complexes, preference is given to using those of the formula II:

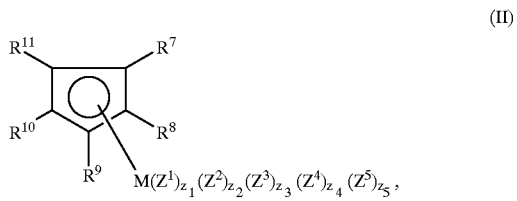

where the substituents and indices have the following meanings:

$R^7$ to $R^{11}$ are hydrogen, $C_1$–$C_{10}$-alkyl, 5- to 7-membered cycloalkyl which may in turn bear $C_1$–$C_6$-alkyl groups as substituents, $C_6$–$C_{15}$-aryl or arylalkyl, where two adjacent radicals may also together form a cyclic group having from 4 to 15 carbon atoms, for example a fuzed-on ring system, or $Si(R^{12})_3$, where $R^{12}$ is $C_1$–$C_{10}$-alkyl, $C_6$–$C_{15}$-aryl or $C_3$–$C_{10}$-cycloalkyl, M is a metal of transition groups III to VI of the Periodic Table of the Elements or a metal of the lanthanide series, $Z^1$ to $Z^5$ are hydrogen, halogen, $C_1$–$C_{10}$-alkyl, $C_6$–$C_{15}$-aryl, $C_1$–$C_{10}$-alkoxy or $C_1$–$C_{15}$-aryloxy and $z_1$ to $z_5$ are each 0, 1, 2, 3, 4 or 5, where the sum $z_1+z_2+z_3+z_4+z_5$ corresponds to the valence of M minus 1.

Particularly preferred metallocene complexes of the formula II are those in which M is a metal of transition group IV of the Periodic Table of the Elements, i.e. titanium, zirconium or hafnium, in particular titanium, and $Z^1$ to $Z^5$ are $C_1$–$C_{10}$-alkyl, $C_1$–$C_{10}$-alkoxy or halogen.

Examples of such preferred metallocene complexes are: pentamethylcyclopentadienyltitanium trichloride, pentamethylcyclopentadienyltrimethyltitanium and pentamethylcyclopentadienyltitanium trimethoxide.

It is also possible to use those metallocene complexes described in EP-A 584 646.

Mixtures of various metallocene complexes can also be used.

The synthesis of such complexes can be carried out by methods known per se, with preference being given to reacting the appropriately substituted, cyclic hydrocarbon anions with halides of titanium, zirconium, hafnium, vanadium, niobium or tantalum.

Examples of corresponding preparative methods are described, inter alia, in Journal of Organometallic Chemistry, 369 (1989), 359–370.

As compound capable of forming metallocenium ions, the catalyst systems can comprise open-chain or cyclic aluminoxane compounds.

Suitable compounds capable of forming metallocenium ions are, for example, open-chain or cyclic aluminoxane compounds of the formula III or IV

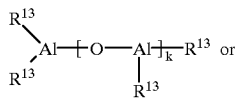 (III)

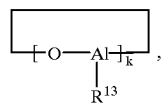 (IV)

where $R^{13}$ is a $C_1$–$C_4$-alkyl group, preferably a methyl or ethyl group, and k is an integer from 5 to 30, preferably from 10 to 25.

The preparation of these oligomeric aluminoxane compounds is usually carried out by reacting a solution of trialkylaluminum with water and is described, inter alia, in EP-A 284 708 and U.S. Pat. No. 4,794,096.

In general, the oligomeric aluminoxane compounds obtained in this way are in the form of mixtures of both linear and cyclic chain molecules of different lengths, so that k is to be regarded as a mean value. The aluminoxane compounds can also be used in admixture with other metal alkyls, preferably with aluminum alkyls.

It has been found to be advantageous to use the metallocene complexes and the oligomeric aluminoxane compound in such amounts that the atomic ratio of aluminum from the oligomeric aluminoxane compound to the transition metal from the metallocene complexes is in the range from 10:1 to 10^4:1, in particular in the range from 20:1 to 9000:1.

As compounds capable of forming metallocenium ions, it is also possible to use coordination compounds selected from the group consisting of strong, uncharged Lewis acids, ionic compounds containing Lewis acid cations and ionic compounds containing Brönsted acids as cations.

As strong, uncharged Lewis acids, preference is given to compounds of the formula V $$M^1X^1X^2X^3 \qquad (V),$$

where $M^1$ is an element of main group III of the Periodic Table, in particular B, Al or Ga, preferably B, $X^1, X^2$ and $X^3$ are hydrogen, $C_1$–$C_{10}$-alkyl, $C_6$–$C_{15}$-aryl, alkylaryl, arylalkyl, haloalkyl or haloaryl each having from 1 to 10 carbon atoms in the alkyl radical and from 6 to 20 carbon atoms in the aryl radical, or fluorine, chlorine, bromine or iodine, in particular haloaryls, preferably pentafluorophenyl.

Particular preference is given to compounds of the formula VI in which $X^1$, $X^2$ and $X^3$ are identical, preferably tris(pentafluorophenyl)borane. These compounds and processes for preparing them are known per se and are described, for example, in WO 93/3067.

Suitable ionic compounds containing Lewis acid cations are compounds of the formula VI $$[(Y^{a+})Q_1Q_2 \ldots Q_z]^{d+} \qquad (VI),$$

where

Y is an element of main groups I to VI or of transition groups I to VIII of the Periodic Table, $Q_1$ to $Q_z$ are singly negatively charged groups such as $C_1$–$C_{28}$-alkyl, $C_6$–$C_{15}$-aryl, alkylaryl, arylalkyl, haloalkyl, haloaryl each having from 6 to 20 carbon atoms in the aryl part and from 1 to 28 carbon atoms in the alkyl part, $C_1$–$C_{10}$-cycloalkyl which may bear $C_1$–$C_{10}$-alkyl groups as substituents, halogen, $C_1$–$C_{28}$-alkoxy, $C_6$–$C_{15}$-aryloxy or silyl or mercaptyl groups, e.g. trimethylsilyl, a is an integer from 1 to 6, z is an integer from 0 to 5, d is the difference a–z, but d is greater than or equal to 1.

Particularly suitable Lewis acid cations are carbonium cations, oxonium cations and sulfonium cations and also cationic transition metal complexes. Particular mention may be made of the triphenylmethyl cation, the silver cation and the 1,1'-dimethylferrocenyl cation.

They preferably have non-coordinating counterions, in particular boron compounds as are also mentioned in WO 91/09882, preferably tetrakis(pentafluorophenyl)borate.

Ionic compounds containing Brönsted acids as cations and preferably likewise non-coordinating counterions are mentioned in WO 93/3067; the preferred cation is N,N-dimethylanilinium.

It has been found to be particularly useful for the molar ratio of boron from the compound capable of forming metallocenium ions to transition metal from the metallocene complex to be in the range from 0.1:1 to 10:1, in particular in the range from 1:1 to 5:1.

The metallocene catalyst system can further comprise an aluminum compound. This can be represented, for example, by the formula VII $$AlR^{14}R^{15}R^{16} \qquad (VII),$$

in which $R^{14}$ to $R^{16}$ are hydrogen, fluorine, chlorine, bromine, iodine or $C_1$–$C_{12}$-alkyl, preferably $C_1$–$C_8$-alkyl.

The radicals $R^{14}$ to $R^{15}$ are preferably identical and are $C_1$–$C_6$-alkyl such as methyl, ethyl, isobutyl or n-hexyl; $R^{16}$ is preferably hydrogen.

This component is preferably present in the catalyst system in an amount of from 1:2000 to 1:1, in particular 1:800 to 1:10 (molar ratio of transition metal from II to Al from VII).

As solvents for the metallocene complexes and the aluminoxane compounds, use is usually made of aromatic hydrocarbons, preferably having from 6 to 20 carbon atoms, in particular xylenes, toluene and ethylbenzene as well as mixtures thereof. The aluminum compounds VII may be dissolved in nonpolar aliphatic or aromatic solvents such as ethylbenzene or cyclohexane.

The metallocene complexes can be used in unsupported or supported form.

Suitable support materials are, for example, silica gels, preferably those of the formula $SiO_2.bAl_2O_3$, where b is from 0 to 2, preferably from 0 to 0.5; i.e. essentially aluminosilicates or silicon dioxide. The supports preferably have a particle diameter in the range from 1 to 200 $\mu$m, in particular from 30 to 80 $\mu$m. Such products are commercially available, e.g. as Silica Gel 332 from Grace.

Further supports are, inter alia, finely divided polyolefins, for example finely divided polypropylene or polyethylene, and also polyethylene glycol, polybutylene terephthalate, polyethylene terephthalate, polyvinyl alcohol, polystyrene, syndiotactic polystyrene, polybutadiene, polycarbonates or their copolymers.

The molar ratio of metallocene complex II to vinylaromatic monomer is generally from 1:1000 to 1:10 000 000, preferably from 1:2000 to 1:1 000 000.

The molar ratio of vinylaromatic compound to the polymer C) is preferably in the range from $10^8$:1 to 1:1, in particular from $10^7$:1 to 10:1.

The reaction can be carried out at from −78° C. to +150° C., preferably from 0° C. to 120° C. It is also possible to change the temperature from, for example, 0° C. to 120° C. over the reaction time.

The polymerization is preferably carried out in the vinylaromatic compound as reaction medium, i.e. in bulk. However, polymerization in solution, suspension or the gas phase is also possible.

A procedure which has been found to be particularly useful is to place the vinylaromatic compound and the polymer C) in the polymerization vessel and then admix them with the compound capable of forming metallocenium ions and the aluminum compound (VII), then to add the metallocene complex (II) and to polymerize for from 0.1 to 10 hours, preferably from 0.5 to 5 hours. The polymerization can be stopped by addition of protic compounds, for example methanol.

In the preferred case, viz. the reaction with styrene, syndiotactic polystyrene is grafted onto the polymer C).

The reaction can be carried out continuously or batchwise. The reactors do not have to meet any particular requirements; the reaction can be carried out, for example, in stirred reactors, autoclaves, kneaders, extruders or vertical reactors.

The graft copolymers of the present invention have high stiffness, tensile strength, dimensional stability and toughness, in particular impact toughness. They are suitable for producing fibers, films and moldings. In the preparation of the graft copolymers of the present invention, it is possible to use graft polymers prepared by free-radical or ionic mechanisms. Furthermore, syndiotactic polystyrene is grafted onto soluble rubber and spherical and lamella rubber morphologies can be produced as a function of the graft polymer used.

EXAMPLES

Examples 1 to 3

Hydroformylations

Example 1

Hydroformylation of an S/B copolymer using rhodium

A solution of Styrolux KR 2691® [symmetrical styrene-butadiene-styrene-triblock copolymer, molar mass Mn about 91 000, butadiene content about 26% by weight, 1,2-vinyl content about 9%] in toluene was prepared by dissolving 100 g of polymer in 900 g of toluene; the solution was freed of air by passing argon through it. In a Schlenk tube, a solution of 0.02 g of $Rh(CO)_2$ acac (0.08 mmol) in 5 ml of toluene was prepared and the resulting solution was degassed by passing argon through it. The two solutions were mixed and placed in a nitrogen-filled 2000 ml autoclave fitted with a stirrer. The autoclave was heated to 150° C. while increasing the pressure to 280 bar by passing in a carbon monoxide/hydrogen mixture (molar ratio 1:1). As a result of the ensuing reaction, the gas pressure dropped during the reaction time and was maintained by repeated introduction of further carbon monoxide/hydrogen mixture (1:1). After 5 hours, heating and gas feed were switched off, the autoclave was cooled and the contents were discharged via a riser tube into an argon-filled reservoir. Part of the toluene (50%) was removed under reduced pressure using a rotary evaporator and the product was subsequently introduced dropwise into methanol (2000 ml), thus precipitating the hydroformylated polymer. The formation of aldehyde groups could be demonstrated unambiguously by IR spectroscopy. Analytical data enabled the degree of conversion of olefinic double bonds and the aldehyde group content of the hydroformylated polymer to be determined: before hydroformylation, the polymer used had an iodine number in accordance with DIN 53241 of,118 g of iodine/100 g of polymer, while after the hydroformylation, 13 g of iodine/100 g of polymer were found. The carbonyl number in accordance with DIN 51558 was less than 1 mg KOH/g of polymer before the hydroformylation and was 180 mg KOH/g after the hydroformylation.

Example 2

Hydroformylation of an S/B copolymer using rhodium

Example 1 was repeated but the hydroformylation was carried out using only 0.005 g of $Rh(CO)_2acac$ (0.02 mmol) and the reaction was stopped after 1 hour; the hydroformylated polymer was worked up in a similar way. Analytical data for the product: iodine number: 105 g of iodine/100 g of polymer; CO number: 20 mg KOH/g of polymer.

Example 3

Cobalt-catalyzed hydroformylation of an S/B copolymer

Example 1 was repeated, but the rhodium hydroformylation catalyst was replaced by cobalt carbonyl $Co_2(CO)_8$ (0.4 g, 2.2 mmol). The reaction was carried out at 180° C. and 280 bar. The reaction time was 2 hours. To reduce acetal formation, 100 g of water were added to the toluene solution of the polymer. After the hydroformylation, the cobalt-containing solution of the hydroformylated polymer was admixed with 10% strength acetic acid (about 400 ml) and stirred at about 70° C. in a glass flask while passing air into it. A color change to pale pink indicated when the oxidation of the cobalt carbonyl was complete. The stirrer and the heating were switched off so that the polymer-containing toluene phase could separate from the water/acetic acid phase. This phase was separated off and the polymer-containing phase was washed with water until neutral.

Taking off the toluene left a colorless product having the following analytical data: iodine number: 40 g of iodine/100 g of polymer; carbonyl number: 120 mg KOH/g.

Example 4
Wittig Salt Preparation

Using a method similar to Tropsch Bull Soc. Chim. Belg, 1987, 96, p. 719, pyridine and p-chloromethylstyrene were reacted to form N-(1-chloro-p-styrylmethylene)pyridinium chloride. 50 mmol of this compound were dissolved in dry chloroform (300 ml) and admixed with 50 mmol of triphenylphosphine at 0° C. After 1 hour, the mixture was treated with diethyl ether (about 600 ml) and extracted a number of times (4–5 times). The N-[(triphenyl-phosphonio)(4-vinylphenyl)methyl]pyridinium dichloride was isolated in a yield of 87% and, after recrystallization, had a melting range of 186–187° C.

Examples 5 to 7
Procedure for a C—C coupling reaction

Example 5
Wittig reaction with polymer from Example 1

100 mmol of the Wittig salt from Example 4 were dissolved in 400 ml of ethanol and 10 g of the polymer from Example 1 were added. At room temperature, 30 ml of a 1 M sodium ethoxide solution were added dropwise, with the temperature not rising above 30° C. The mixture was stirred for 4 hours and the polymer was precipitated by addition of water.

Iodine number before Wittig reaction: 13 g of iodine/100 g of polymer

Iodine number after Wittig reaction: 221 g of iodine/100 g of polymer (Product: polymer Ex. 5)

Example 6
Wittig reaction using polymer from Example 2

60 mmol of the Wittig salt from Example 4 were dissolved in 400 ml of ethanol and 10 g of the polymer from Example 2 were added. At room temperature, 30 ml of a 1 M sodium ethoxide solution were added dropwise, with the temperature not rising above 30° C. The mixture was stirred for 4 hours and the polymer was precipitated by addition of water.

Iodine number before Wittig reaction: 105 g of iodine/100 g of polymer

Iodine number after Wittig reaction: 129 g of iodine/100 g of polymer (Product: polymer Ex. 6)

Example 7
Wittig reaction using polymer from Example 3

75 mmol of the Wittig salt from Example 4 were dissolved in 400 ml of ethanol and 10 g of the polymer from Example 3 were added. At room temperature, 30 ml of a 1 M sodium ethoxide solution were added dropwise, with the temperature not rising above 30° C. The mixture was stirred for 4 hours and the polymer was precipitated by addition of water.

Iodine number before Wittig reaction: 40 g of iodine/100 g of polymer

Iodine number after Wittig reaction: 178 g of iodine/100 g of polymer (product: polymer Ex. 7)

Examples 8 to 10
Reaction with Styrene

Example 8

A round-bottom flask which had been made inert with nitrogen was charged with 1.0 mol of styrene (104.2 g) and 15 g of the polymer from Example 5, the mixture was heated to 60° C. and admixed with 8.16 ml of methylaluminoxane (MAO) from Witco (1.53 M in toluene) and 2.08 ml of diisobutylaluminum hydride DIBAH (1.0 M in cyclohexane) from Aldrich. Subsequently, the mixture was treated with 9.5 mg ($4.16*10^{-5}$ mol) of Cp*TiMe$_3$ (pentamethylcyclopentadienyltrimethyltitanium). The internal temperature was regulated at 60° C. and the mixture was polymerized for 2 hours. The resulting polymer precipitated after a reaction time of only 10 minutes and the mixture became inhomogeneous. After 2 hours, the polymerization was stopped by addition of methanol. The polymer obtained was washed with methanol and dried at 50° C. under reduced pressure. The molar masses and their distribution were determined by high-temperature GPC at 135° C. using 1,2,4-trichlorobenzene as solvent. Calibration was carried out by means of narrow-distribution polystyrene standards. The molar mass $M_w$ was 467 300 with a polydispersity of $M_w/M_n$=2.6. The syndiotactic content determined by $^{13}$C-NMR was>90%. The conversion was 86%, based on the styrene monomer used.

The impact toughness on injection-molded test specimens in accordance with DIN 53453-n was 38 kJ/m$^2$, the failure stress was 28.2 MPa (DIN 53455) and the elongation at break (DIN 53455) was 2.7%.

Example 9

A round-bottom flask which had been made inert with nitrogen was charged with 1.0 mol of styrene (104.2 g) and 15 g of the polymer from Example 6, the mixture was heated to 60° C. and admixed with 8.16 ml of methylaluminoxane (MAO) from Witco (1.53 M in toluene) and 2.08 ml of diisobutylaluminum hydride DIBAH (1.0 M in cyclohexane) from Aldrich. Subsequently, the mixture was treated with 9.5 mg ($4.16*10^{-5}$ mol) of Cp*TiMe$_3$ (pentamethylcyclopenta-dienyltrimethyltitanium). The internal temperature was regulated at 60° C. and the mixture was polymerized for 2 hours. The resulting polymer precipitated after a reaction time of only 10 minutes and the mixture became inhomogeneous. After 2 hours, the polymerization was stopped by addition of methanol. The polymer obtained was washed with methanol and dried at 50° C. under reduced pressure. The molar masses and their distribution were determined by high-temperature GPC at 135° C. using 1,2,4-trichlorobenzene as solvent. Calibration was carried out by means of narrow-distribution polystyrene standards. The molar mass M, was 212 700 with a polydispersity of $M_w/M_n$=2.4. The syndiotactic content determined by $^{13}$C-NMR was>90%. The conversion was 54%, based on the styrene monomer used.

The impact toughness on injection-molded test specimens in accordance with DIN 53453-n was 17 kJ/m$^2$, the failure stress was 34.4 MPa (DIN 53455) and the elongation at break (DIN 53455) was 2.1%.

Example 10

A round-bottom flask which had been made inert with nitrogen was charged with 1.0 mol of styrene (104.2 g) and 15 g of the polymer from Example 7, the mixture was heated to 60° C. and admixed with 8.16 ml of methylaluminoxane (MAO) from Witco (1.53 M in toluene) and 2.08 ml of diisobutylaluminum hydride DIBAH (1.0 M in cyclohexane) from Aldrich. Subsequently, the mixture was treated with 9.5 mg ($4.16*10^{-5}$ mol) of Cp*TiMe$_3$. The internal temperature was regulated at 60° C. and the mixture was polymerized for 2 hours. The resulting polymer precipitated after a reaction time of only 10 minutes and the mixture became inhomogeneous. After 2 hours, the polymerization was stopped by addition of methanol. The polymer obtained was washed with methanol and dried at 50° C. under reduced pressure. The molar masses and their distribution were determined by high-temperature GPC at 135° C. using 1,2,4-trichlorobenzene as solvent. Calibration was carried out by means of narrow-distribution polystyrene standards. The molar mass $M_w$ was 243 800 with a polydispersity of $M_w/M_n=2.3$. The syndiotactic content determined by $^{13}$C-NMR was>90%. The conversion was 71%, based on the styrene monomer used.

The impact toughness on injection-molded test specimens in accordance with DIN 53453-n was 26 kJ/m$^2$, the failure stress was 32.1 MPa (DIN 53455) and the elongation at break (DIN 53455) was 25 2.2%.

Comparative Examples 11 and 12

Comparative Example 11

A round-bottom flask which had been made inert with nitrogen was charged with 1.0 mol of styrene (104.2 g), the mixture was heated to 60° C. and admixed with 8.16 ml of methylaluminoxane (MAO) from Witco (1.53 M in toluene) and 2.08 ml of diisobutylaluminum hydride DIBAH (1.0 M in cyclohexane) from Aldrich. Subsequently, the mixture was treated with 9.5 mg (4.16*10$^{-5}$ mol) of Cp*TiMe$_3$. The internal temperature was regulated at 60° C. and the mixture was polymerized for 2 hours. The resulting polymer precipitated after a reaction time of only 10 minutes and the mixture became inhomogeneous. After 2 hours, the polymerization was stopped by addition of methanol. The polymer obtained was washed with methanol and dried at 50° C. under reduced pressure. The molar masses and their distribution were determined by high-temperature GPC at 135° C. using 1,2,4-trichlorobenzene as solvent. Calibration was carried out by means of narrow-distribution polystyrene standards. The molar mass $M_w$ was 320 800 with a polydispersity of $M_w/M_n=2.1$. The syndiotactic content determined by $^{13}$C-NMR was>90%. The conversion was 73%, based on the styrene monomer used.

The impact toughness on injection-molded test specimens in accordance with DIN 53453-n was 2 kJ/m$^2$, the failure stress was 48.7 MPa (DIN 53455) and the elongation at break (DIN 53455) was 1.4%.

Comparative Example 12

Pure syndiotactic polystyrene (100 g) from Comparative Example 11 was compounded with 15 g of the polymer from Example 7 for 5 minutes at 290° C. in a kneader from Haake (Rheomex) and the blend obtained was tested. The impact toughness of injection-molded test specimens in accordance with DIN 53453-n was 3 kJ/m$^2$, the failure stress was 47.5 MPa (DIN 53455) and the elongation at break (DIN 53455) was 1.2%.

We claim:

1. A graft copolymer obtainable by
   a) reacting vinylaromatic compounds with conjugated dienes to form polymers A) which contain C=C double bonds,
   b) hydroformylating C=C double bonds present in the polymer A) in the presence of carbon monoxide, hydrogen and a hydroformylation catalyst to form a polymer B),
   c) isolating the partially or completely hydroformylated polymer B),
   d) carrying out a C—C-coupling reaction on the formyl groups of the polymer B) with incorporation of a vinylaromatic unit to form a polymer C) and
   e) reacting the polymer C) with vinylaromatic compounds in the presence of a metallocene catalyst system.

2. A graft copolymer as claimed in claim 1, wherein the vinylaromatic compounds used in step a) and step e) are compounds of the formula I

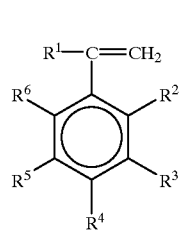

(I)

where the substituents have the following meanings:
   $R^1$ is hydrogen or $C_1$–$C_4$-alkyl,
   $R^2$ to $R^6$ are, independently of one another, hydrogen, $C_1$–$C_{12}$-alkyl, $C_6$–$C_{18}$-aryl, halogen or two adjacent radicals together form a cyclic group having from 4 to 15 carbon atoms.

3. A graft copolymer as claimed in claim 1 or 2, wherein step d) is carried out as a Wittig reaction.

4. A graft copolymer as claimed in any of claims 1 to 2, wherein the metallocene catalyst systems used in step e) are ones which are obtainable from a metallocene complex, a compound capable of forming metallocenium ions and, if desired, an aluminum compound.

5. A process for preparing graft copolymers using the process conditions of claim 1.

6. A fiber, film or molding comprising a graft copolymer as claimed in any of claims 1 to 2 as significant component.

* * * * *

UNITED STATES PATENT AND TRADEMARK OFFICE
CERTIFICATE OF CORRECTION

PATENT NO.: 6,025,447

DATED: February 15, 2000

INVENTOR(S): WUENSCH et al.

It is certified that error appears in the above-identified patent and that said Letters Patent is hereby corrected as shown below:

Col. 12, claim 3, line 41, delete "or 2".

Signed and Sealed this

Twenty-eighth Day of November, 2000

Attest:

Q. TODD DICKINSON

*Attesting Officer*            *Director of Patents and Trademarks*